(12) United States Patent  
Asente

(10) Patent No.: US 8,146,021 B1  
(45) Date of Patent: Mar. 27, 2012

(54) USER INTERFACE FOR PATH DISTORTION AND STROKE WIDTH EDITING

(75) Inventor: Paul J. Asente, Redwood City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 397 days.

(21) Appl. No.: 12/583,341

(22) Filed: Aug. 18, 2009

(51) Int. Cl.  
*G06F 3/00* (2006.01)

(52) U.S. Cl. .................. 715/863; 715/765; 715/769

(58) Field of Classification Search .......... 715/764, 715/765, 769, 863, 964  
See application file for complete search history.

(56) References Cited

U.S. PATENT DOCUMENTS

| | | | | |
|---|---|---|---|---|
| 6,938,217 B1 * | 8/2005 | Ubillos | | 715/835 |
| 7,568,171 B2 * | 7/2009 | Boylan | | 715/863 |
| 2010/0185949 A1 * | 7/2010 | Jaeger | | 715/730 |

* cited by examiner

*Primary Examiner* — Xiomar L Bautista  
(74) *Attorney, Agent, or Firm* — Van Pelt, Yi & James LLP

(57) ABSTRACT

A technique for modifying a stretch of path is disclosed. The technique includes receiving an indication of a drag gesture associated with a designated point on a path, identifying the first path corner or endpoint on either side of the designated point as limit points, defining a smooth stretch of the path as a portion of the path between the limit points, and modifying the smooth stretch of the path based on the drag gesture without modifying portions outside of the smooth stretch.

20 Claims, 13 Drawing Sheets

USER INTERFACE FOR PATH DISTORTION AND STROKE WIDTH EDITING

BACKGROUND

Drawing applications, such as Adobe® Illustrator® and Adobe® Flash®, provide various tools for modifying paths in a drawing. User interfaces for modifying paths in a drawing can be unpredictable, difficult to use, and limited in behavior.

BRIEF DESCRIPTION OF THE DRAWINGS

Various embodiments are disclosed in the following detailed description and the accompanying drawings.

DETAILED DESCRIPTION

The techniques disclosed can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
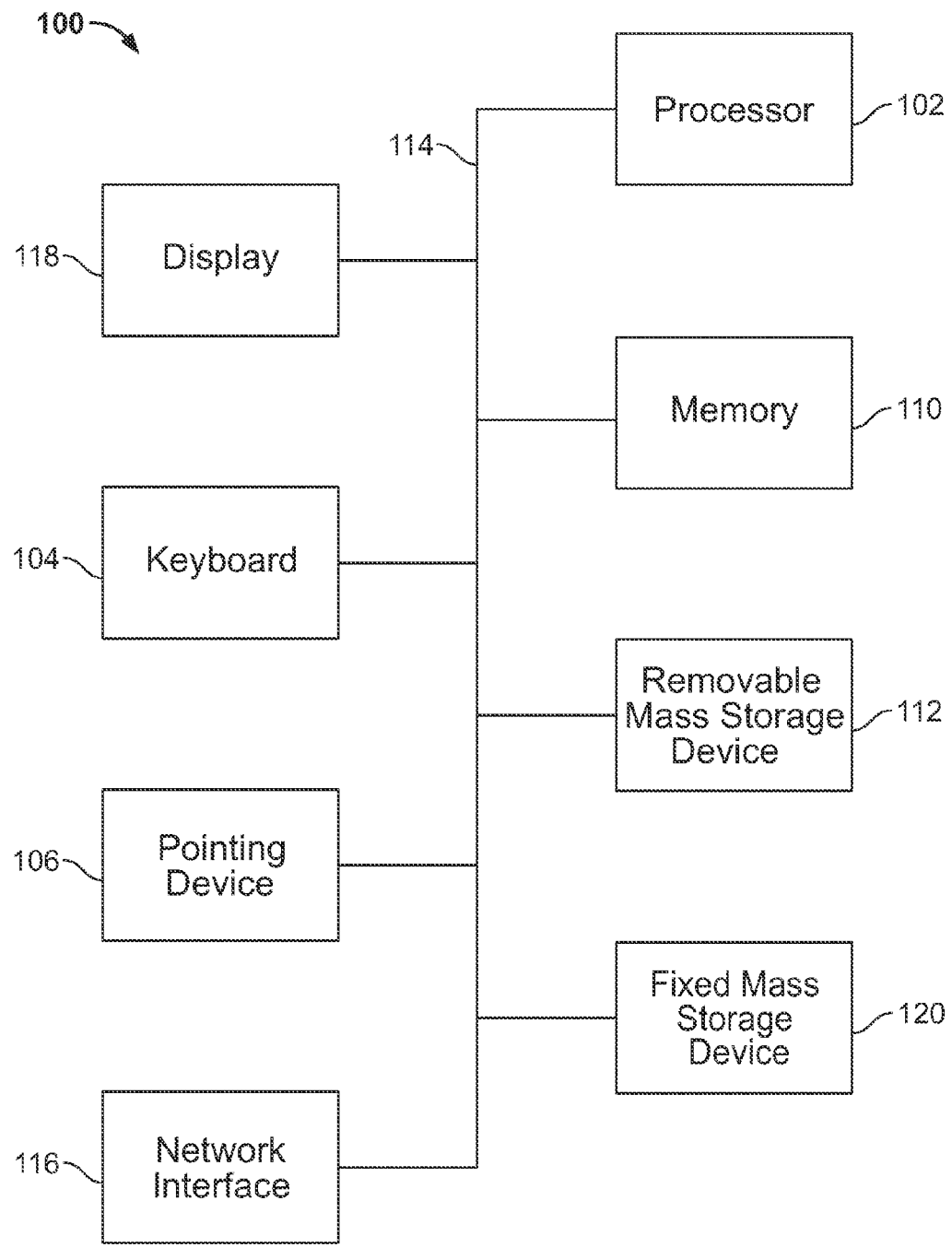
FIG. 1 is a functional diagram illustrating a programmed computer system for modifying a portion of a path in accordance with some embodiments.

FIG. 1 is a functional diagram illustrating a programmed computer system for modifying a portion of a path in accordance with some embodiments. As shown, FIG. 1 provides a functional diagram of a general purpose computer system programmed to modify a portion of a path in accordance with some embodiments. As will be apparent, other computer system architectures and configurations can be used to perform context sensitive script editing for form design. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 performs/executes the functionality described below with respect FIGS.

2-12 and 14-27 and/or performs/executes the processes described below with respect to FIG. 13.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically, includes basic operating instructions, program code, data and objects used by the processor 102 to perform its functions (e.g., programmed instructions). For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110 (e.g., RAM) as virtual memory.

In addition to providing processor 102 access to storage subsystems, bus 114 can be used to provide access other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions), from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

A technique for modifying a path is disclosed. Modifying may include reshaping a path and/or modifying a width of a path. In some embodiments, the technique includes receiving an indication of a drag gesture associated with a designated point on a path, where the designated point could be selected or unselected, identifying a limit point on either side of the selected point, defining a smooth portion of the path as the portion of the path between the limit points, and modifying the modifiable portion of the path based on the drag gesture without modifying portions outside of the smooth portion.

Figure 2:
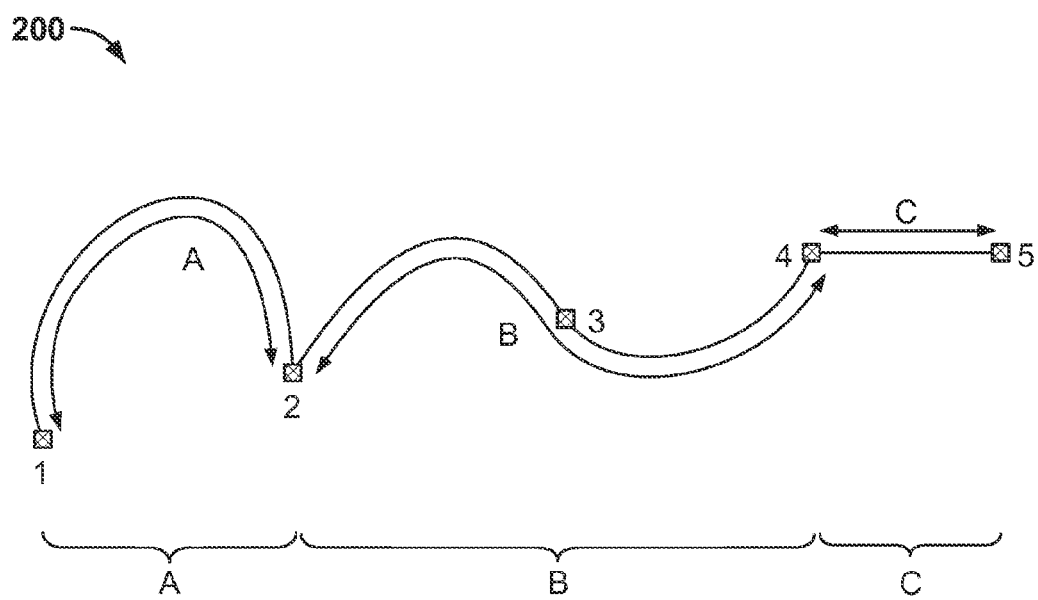
FIG. 2 is a diagram illustrating an example of a path before modification.

FIG. 2 is a diagram illustrating an example of a path before modification. In this example, path 200 is shown to include five anchor points (1-5) and three smooth stretches (A, B, and C). Smooth stretch B contains two path segments. As used herein, a "smooth stretch" is a set of path segments that has no interior corners, where "interior" refers to a point that is in between the endpoints of the path. A smooth stretch is bounded at either end by a corner or a path endpoint. In various embodiments, a corner may be defined in various ways. In some embodiments, a corner is defined geometrically. For example, an anchor point is a corner if the segments going in and out of the anchor point (e.g., segments tangent to the anchor point on either side of the anchor point) differ from being straight (e.g., aligned with one another) by more than some angle (e.g., a couple of degrees). In some embodiments, a point on a path is a corner if the tangents to the points on either side of the point intersect at an angle that is within a prescribed range of angles. In some embodiments, a corner is defined as either an anchor point that is a corner in Adobe® Illustrator® (i.e., the two out control points are independently manipulable). In various embodiments, the definition of corner may be user selected and/or user defined.

As used herein, the "limit points" of a smooth stretch are the corner or end anchor points that bound the smooth stretch. In other words, the smooth stretch is bounded on each side by the first corner or end (anchor) point on each side. The "interior points" of a smooth stretch are the anchor points between the limit points. A smooth stretch that has only one path segment has no interior points. The "selection tolerance" is the distance a cursor can be from a path and have a click (e.g., of a mouse or other input device) select it. For example, the selection tolerance may be on the order of 3 pixels.

A point, segment, or path may be selected in various ways in various embodiments. For example, a point, such as anchor point 2, may be selected by placing a cursor within the selection tolerance of anchor point 2 and then clicking a mouse. A segment, such as the segment between anchor points 2 and 3, may be selected by placing a cursor within the selection tolerance of the segment and then clicking a mouse. Multiple point(s), segment(s), and/or path(s) may be selected in various ways. For example, after selecting a first point, segment, or path, a user may place a cursor within the selection tolerance of a second point, segment, or path, and simultaneously press the Ctrl or Shift key and click a mouse in order to add the second point, segment, or path to the selection, so that both the first point, segment, or path and the second point, segment, or path become selected. For example, smooth stretch B may be selected in this way (e.g., by first selecting the segment between anchor points 2 and 3, and then selecting the segment between anchor points 3 and 4).

In some embodiments, a reshape tool may have additional selection behavior, such as the following:

Clicking within the selection tolerance of a path acts as if it had been done with the Adobe® Illustrator® Direct Select tool. If the click is within the tolerance of an anchor point, it selects that point. If the click is not within the tolerance, it "hollow anchor point" selects the path, activating it for manipulation without selecting any anchor points.

If a user starts a drag with the initial mouse down and the cursor is not in a zone that would initiate a reshape or width adjustment (described below), it begins a marquee selection of anchor points, just as with the Adobe® Illustrator® Direct Select tool. Alternatively, it begins a Lasso tool selection of anchor points.

In either of these cases, the Shift key behaves as it does with the Adobe® Illustrator® Direct Select tool, adding and subtracting anchor points from the selection.

In some embodiments, the above reshape tool selection behavior augments existing selection behavior and does not replace it. In some embodiments, reshaping and width adjustment (described below) behaviors are the same regardless of the selection method. The Shift key adds and subtracts anchor points from the current selection no matter how it was made.

As used herein, a drag or drag gesture refers to placing a cursor at a point on a display, pressing and holding down a mouse or other input button, and then moving the cursor (e.g., using the mouse). In some cases, a drag may be used to select one or multiple point(s), segment(s), or path(s). For example, if a drag is started with the cursor not in a zone that would initiate a reshape or width adjustment (described below), it begins a marquee selection of anchor points, as done with the Adobe® Illustrator® Direct Select tool. Alternatively, it may begin a Lasso tool selection of anchor points.

In some embodiments, if the cursor is not within the selection tolerance of an anchor point, path is activated for manipulation without selecting any anchor points.

FIGS. 3-7 illustrate examples of a path after reshaping by dragging a smooth stretch when nothing is selected. Reshaping occurs using a drag gesture that starts with its mouse down within the selection tolerance of a path. In some embodiments, any drag gesture that starts within the selection tolerance is a reshape drag.

As will be shown by FIGS. 3-7, if a reshape drag begins on an unselected anchor point or on a path segment not between two selected anchor points, the following rules apply in some embodiments:

(1) The entire path is activated for manipulation if it is currently unselected. If it is currently partially selected, the selection does not change.

(2) If the mouse down is not on a limit point of a smooth stretch, the reshape affects the smooth stretch around the mouse down. The smooth stretch's limit points do not move but all interior points move. The behavior is exactly the same as how the Adobe® Illustrator® Reshape tool behaves if all the interior points were selected and the limit points were unselected.

(3) If the mouse down is on the limit point of a smooth stretch, the reshape affects the smooth stretch or stretches adjacent to the mouse down (on both sides if a corner, or on one side if an endpoint). The other limit points of the stretches do not move but the corner or endpoint and the interior points of the stretches move. The behavior is the same as how the Adobe® Illustrator® Reshape tool behaves if the corner or endpoint and all the interior points were selected and the other limit points were unselected.

(4) If the path is a closed path that has no corners, the smooth stretch is the entire path. The drag moves the path without reshaping it. Alternatively, find the place on the curve that is most opposite the mouse down point (halfway around in each direction) and keep the closest anchor point to this place fixed.

In FIGS. 3-12, the original path is shown in gray and the modified path is shown in black.

Figure 3:
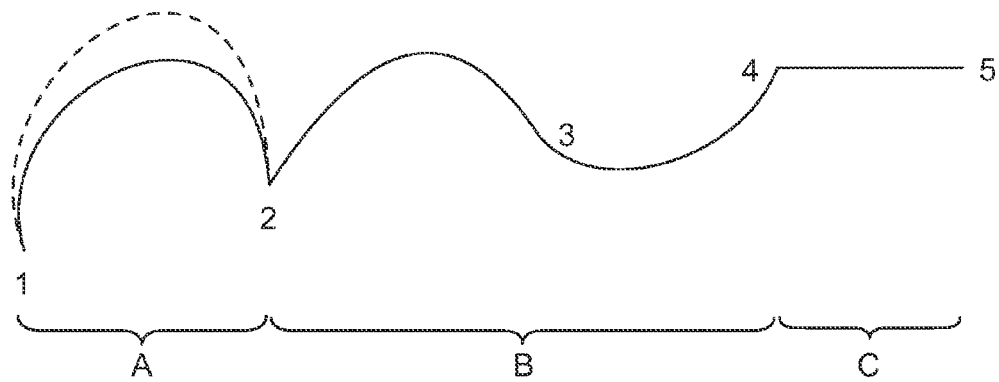
FIG. 3 is a diagram illustrating an example of a path after a stretch comprising a single segment is dragged.

FIG. 3 is a diagram illustrating an example of a path after a stretch comprising a single segment is dragged. In the example shown, path 200 is shown after a stretch is dragged when nothing is selected. In other words, a user has not selected any point or segment in path 200, places a cursor within the selection tolerance of stretch A, and then drags downward. As a result, stretch A is reshaped as shown. In this example, the cursor is not placed within the selection tolerance of a limit point (i.e., a corner or end anchor point that bounds stretch A) of stretch A before dragging. Therefore, the limit points of stretch A (anchor points 1 and 2) are fixed and the interior points of stretch A move. (Rule 2)

Figure 4:
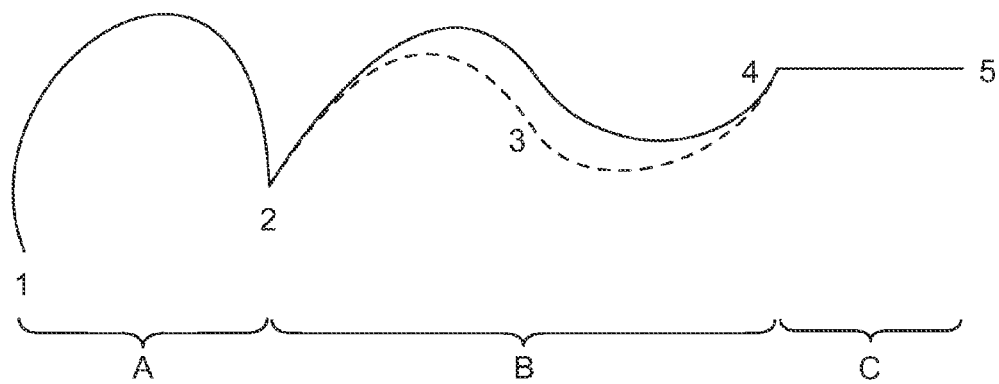
FIG. 4 is a diagram illustrating an example of a path after a stretch comprising two segments is dragged.

FIG. 4 is a diagram illustrating an example of a path after a stretch comprising two segments is dragged. In the example shown, path 200 is shown after a stretch comprising two segments is dragged when nothing is selected. In other words, a user has not selected any point or segment in path 200, places a cursor within the selection tolerance of stretch B, and then drags upward. As a result, the entire stretch B, including the two segments, is reshaped as shown. In this example, the cursor is not placed within the selection tolerance of a limit point (i.e., a corner or end anchor point that bounds stretch B) of stretch B before dragging. Therefore, the limit points of stretch B (anchor points 2 and 4) are fixed and the interior points of stretch A move. (Rule 2)

Figure 5:
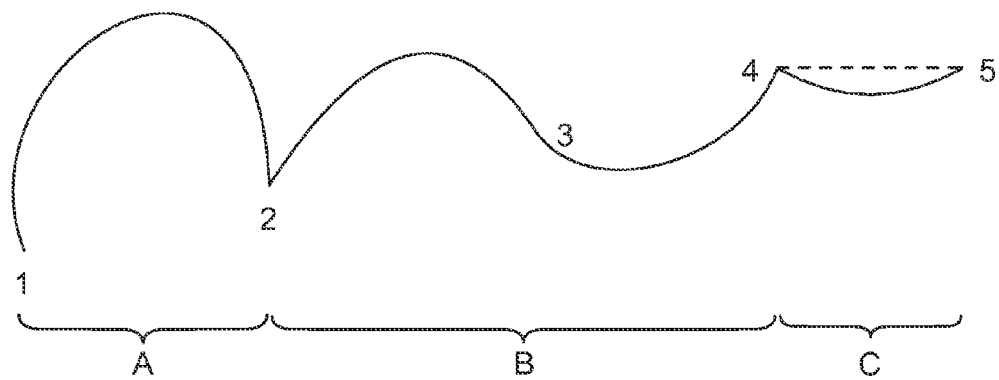
FIG. 5 is a diagram illustrating an example of a path after a stretch comprising a single straight segment is dragged.

FIG. 5 is a diagram illustrating an example of a path after a stretch comprising a single straight segment is dragged. In the example shown, path 200 is shown after a stretch is dragged when nothing is selected. In other words, a user has not selected any point or segment in path 200, places a cursor within the selection tolerance of stretch C, and then drags downward. As a result, stretch C is reshaped as shown. In this example, the cursor is not placed within the selection tolerance of a limit point (i.e., a corner or end anchor point that bounds stretch C) of stretch C before dragging. Therefore, the limit points (anchor points 4 and 5) are fixed and the interior points of stretch C move. (Rule 2)

Figure 6:
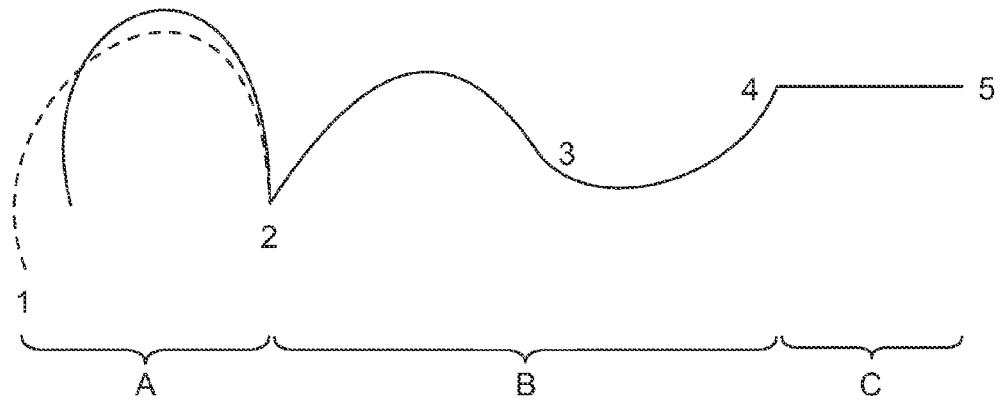
FIG. 6 is a diagram illustrating an example of a path after an end anchor point is dragged.

FIG. 6 is a diagram illustrating an example of a path after an end anchor point is dragged. In the example shown, path 200 is shown after an end anchor point is dragged when nothing is selected. In other words, a user has not selected any point or segment in path 200, places a cursor within the selection tolerance of anchor point 1, and then drags upward and to the right. As a result, stretch A is reshaped as shown. In this example, the cursor is placed within the selection tolerance of a limit point (i.e., a corner or end anchor point that bounds stretch A) of stretch A before dragging. Therefore, both the limit point (anchor point 1) and the interior points of the smooth stretch (stretch A) adjacent to the limit point (anchor point 1) move. The other limit point (anchor point 2) is fixed. (Rule 3)

Figure 7:
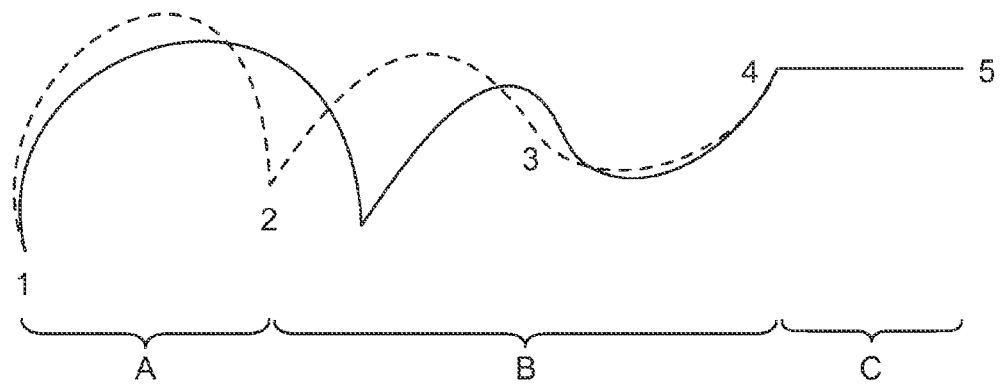
FIG. 7 is a diagram illustrating an example of a path after an anchor point is dragged.

FIG. 7 is a diagram illustrating an example of a path after an anchor point is dragged. In the example shown, path 200 is shown after an anchor point is dragged when nothing is selected. In other words, a user has not selected any point or segment in path 200, places a cursor within the selection tolerance of anchor point 2, and then drags downward and to the right. As a result, stretches A and B are reshaped as shown. In this example, the cursor is placed within the selection tolerance of a limit point (i.e., a corner or end anchor point that bounds stretches A and B) of stretches A and B before dragging. Therefore, both the limit point (anchor point 2) and the interior points of the smooth stretches (stretches A and B) adjacent to the limit point (anchor point 2) move. The other limit points (anchor points 1 and 4) of the smooth stretches A and B are fixed. (Rule 3)

FIGS. 8-12 illustrate examples of a path after reshaping by dragging a smooth stretch when a portion of the path (e.g., an anchor point or segment) is selected.

As will be shown by FIGS. 8-12, if a reshape drag begins on a selected anchor point or between two selected anchor points, the following rules apply in some embodiments:

(5) The reshape affects the selected portion of the path, out to the first unselected anchor point in either direction. The selected anchor points move but the unselected ones do not. If the path has other anchor points selected not adjacent to the mouse down point, those portions do not reshape; the tool only affects the selected portion of the path that contains where the reshape drag begins.

(6) Special case: On an open path, if the selected part of the path includes an endpoint, and the reshape drag didn't begin on that endpoint, the reshape acts as if that endpoint were unselected so it does not move. In particular, if an open path is fully selected, and the reshape begins anywhere but on an endpoint, the reshape behaves as if both endpoints were unselected. The endpoints do not move but the entire path reshapes.

(7) As a result of Rule 6, on an open path, if the selected part of the path includes an endpoint, and the reshape drag begins on that endpoint, that endpoint is included in the reshape. In particular, if an open path is fully selected, and the reshape begins on an endpoint, the reshape behaves as if the other endpoint were unselected. It does not move but the entire path reshapes.

(8) Also as a result of Rule 6, if a closed path is fully selected, the drag moves the path without reshaping it. Alternatively, find the place on the curve that is most opposite the mouse down point (halfway around in each direction) and keep the closest anchor point to this place fixed.

In some embodiments, in the case of multiple paths, if the reshape drag begins within the tolerance of multiple paths, all of the paths that are fully or partially selected are affected. If none of the paths are fully or partially selected, only the path that is uppermost in the stacking order is affected. If some of the paths are fully or partially selected, but not others, the fully or partially selected paths are affected and the unselected ones are not, even if the unselected ones are higher in the stacking order.

Figure 8:
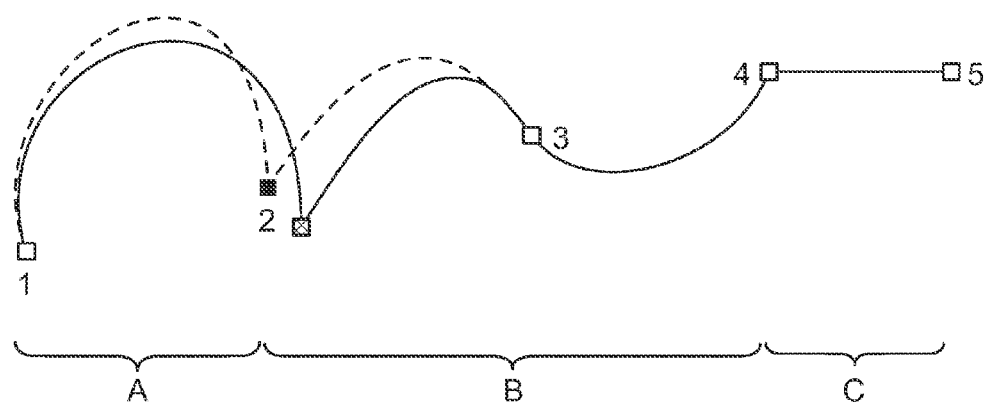
FIG. 8 is a diagram illustrating an example of a path after a selected anchor point is dragged.

FIG. 8 is a diagram illustrating an example of a path after a selected anchor point is dragged. In the example shown, path 200 is shown after an anchor point is dragged when the anchor point is selected. In this example, a user has selected anchor point 2 in path 200, placed a cursor within the selection tolerance of anchor point 2, and then dragged downward and to the right. As a result, stretch A and the segment of stretch B between anchor points 2 and 3 are reshaped as shown. Anchor points 1 and 3 remain fixed and the portion of path 200 between anchor points 1 and 3 is modified. This is because anchor points 1 and 3 are the first unselected anchor points adjacent to selected anchor point 2 in either direction. (Rule 5)

Figure 9:
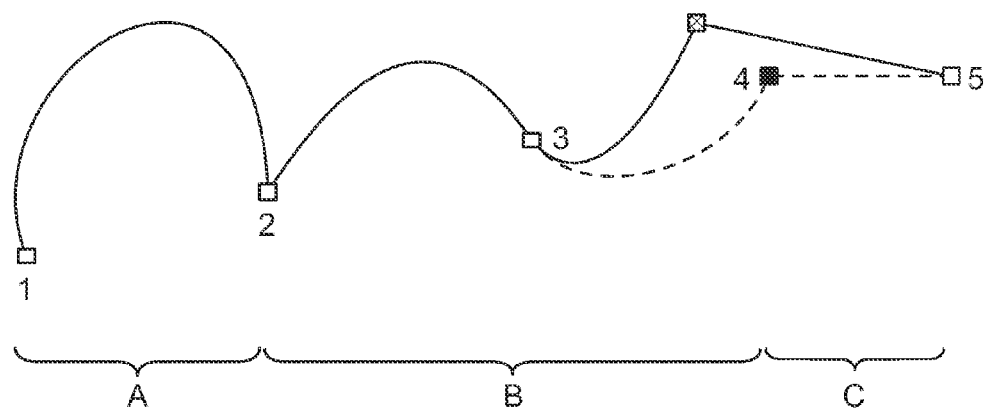
FIG. 9 is a diagram illustrating an example of a path after a selected anchor point is dragged.

FIG. 9 is a diagram illustrating an example of a path after a selected anchor point is dragged. In the example shown, path 200 is shown after an anchor point is dragged when the anchor point is selected. In this example, a user has selected anchor point 4 in path 200, placed a cursor within the selection tolerance of anchor point 4, and then dragged upward and to the left. As a result, stretch C and the segment of stretch B between anchor points B and C are reshaped as shown. Anchor points 3 and 5 remain fixed and the portion of path 200 between anchor points 3 and 5 is modified. This is because anchor points 3 and 5 are the first unselected anchor points adjacent to selected anchor point 4 in either direction. (Rule 5)

Figure 10:
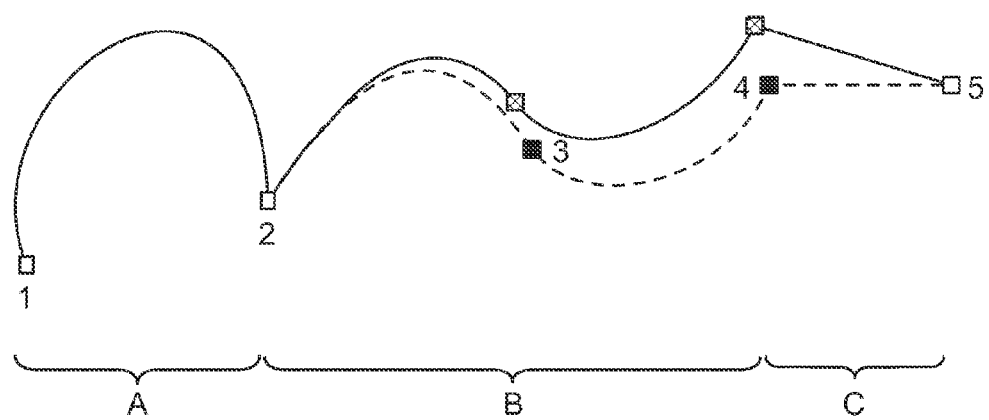
FIG. 10 is a diagram illustrating an example of a path after a point on a path between two selected anchor points is dragged.

FIG. 10 is a diagram illustrating an example of a path after a point on a path between two selected anchor points is dragged. In this example, a user has selected anchor points 3 and 4 in path 200, placed a cursor within the selection tolerance of a point on path 200 between anchor points 3 and 4, and then dragged upwards. As a result, stretches B and C are reshaped as shown. Anchor points 2 and 5 remain fixed and the portion of path 200 between anchor points 2 and 5 is modified. This is because anchor points 2 and 5 are the first unselected anchor points adjacent to selected anchor points 3 and 4 in either direction. (Rule 5)

Figure 11:
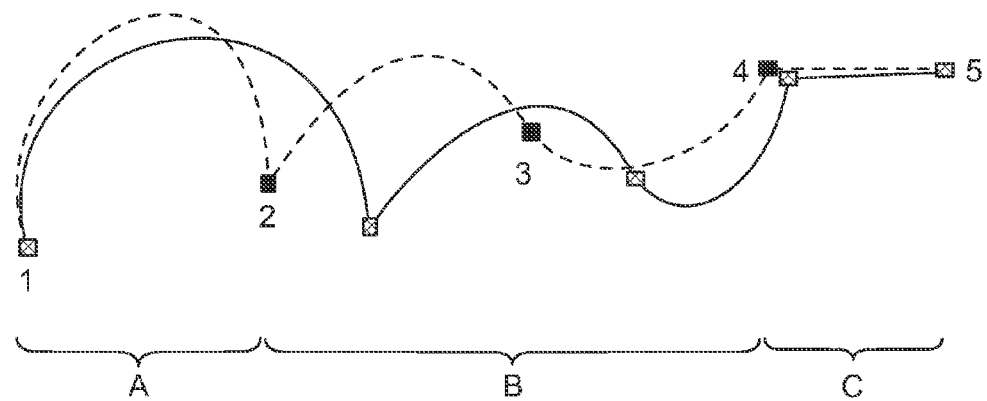
FIG. 11 is a diagram illustrating an example of a path after a point on a path is dragged when the path is fully selected.

FIG. 11 is a diagram illustrating an example of a path after a point on a path is dragged when the path is fully selected. In this example, a user has selected all anchor points on path 200, placed a cursor within the selection tolerance of a point in the middle of path 200, and then dragged downward and to the right. As a result, stretches A, B, and C are reshaped as shown. Anchor points 1 and 5 remain fixed and the portion of path 200 between anchor points 1 and 5 is modified. This is because anchor points 1 and 5 are endpoints. (Rule 6)

Figure 12:
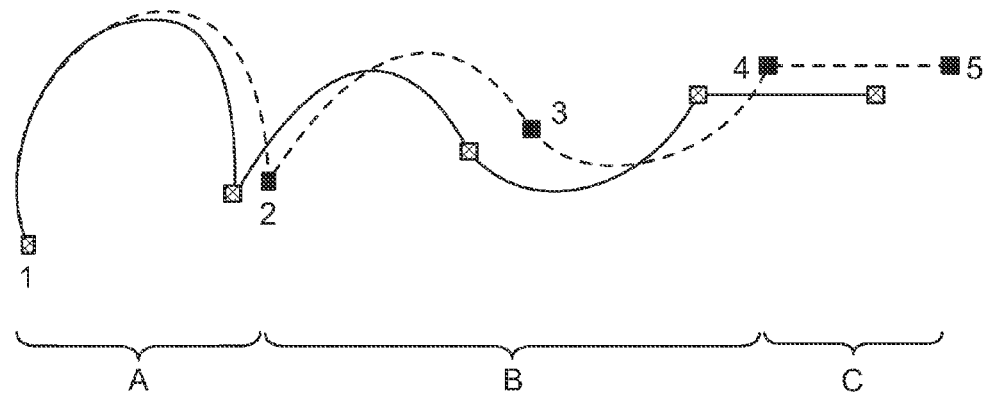
FIG. 12 is a diagram illustrating an example of a path after an endpoint of a path is dragged when the path is fully selected.

FIG. 12 is a diagram illustrating an example of a path after an endpoint of a path is dragged when the path is fully selected. In this example, a user has selected all anchor points on path 200, placed a cursor within the selection tolerance of endpoint 5 of path 200, and then dragged downward and to the left. As a result, stretches A, B, and C are reshaped as shown. Anchor point 1 remains fixed and the rest of path 200 (including anchor point 5) is modified. This is because anchor points 1 and 5 are endpoints and endpoint 5 is being dragged. (Rule 7)

In some embodiments, modifier keys may be used to modify or alter the behavior of the reshape. Some examples of modifier keys include the following:

If the Option/Alt modifier is held down or depressed when the reshape drag completes, the original path is unmodified and a modified copy is inserted immediately above the original in the stacking order.

If the Shift key is down during the drag, the effective drag point is constrained in a way defined by the application, such as horizontally or vertically.

Figure 13:
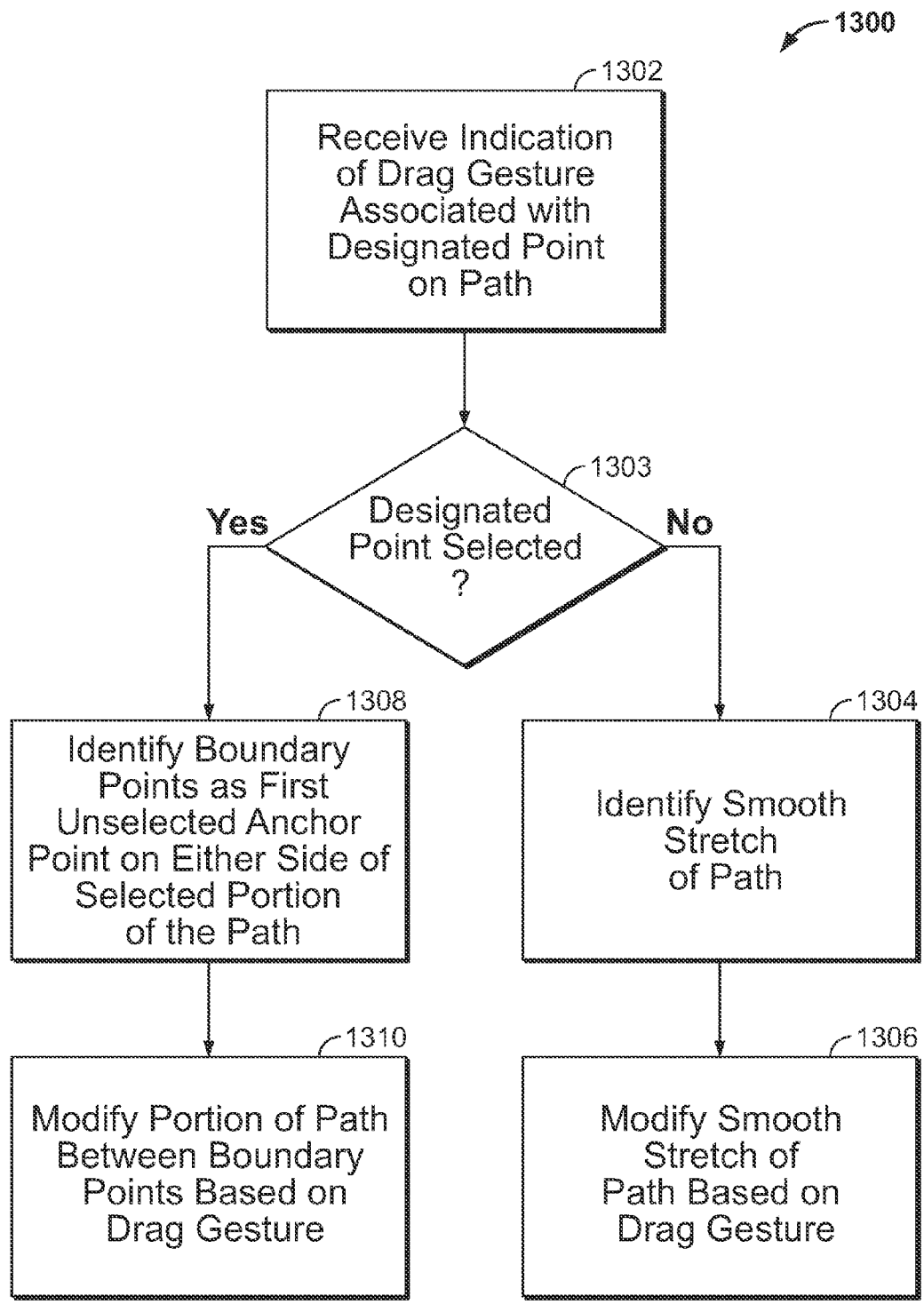
FIG. 13 is a flow chart illustrating an embodiment of a process for modifying a path.

FIG. 13 is a flow chart illustrating an embodiment of a process for modifying a path. In some embodiments, process 1300 is used to perform the modifications shown in FIGS. 3-12.

At 1302, an indication of a drag gesture associated with a designated point on a path is received. For example, a user places a cursor within the selection tolerance of a path and presses or holds down a mouse or other input button, and then moves the cursor (e.g., using the mouse) to drag. The location of the cursor when the user initially presses or holds down the mouse or other input button is referred to as the "mouse down" point. The mouse down point is within the selection tolerance of a designated point on the path. (For purposes of explanation, in some of the examples described herein, "mouse down point" and "designated point" are used interchangeably when the mouse down point is within the selection tolerance of the designated point.) There may be more than one designated point. For example, the initial location of the cursor may be within the selection tolerance of multiple points on the path. In some cases, the designated point could be one or more selected points on the path (i.e., prior to 1302, the user has selected anchor point or other point(s) or portion(s) of a path, such as one or more segments).

At 1303, it is determined whether the designated point is selected. The designated point is selected if it is itself selected and/or if the designated point is on a selected portion of the path. For example, the designated point may be on a selected segment of the path.

If it is determined that the designated point is not selected, then at 1304, a smooth stretch is identified. The smooth stretch is identified by first identifying a limit point on either side of the designated point(s) and then defining the smooth stretch as the portion of the path between the limit points. The limit points may be corner points or end anchor points, as previously described.

At 1306, the smooth stretch is modified based on the drag gesture without modifying portions outside of the smooth stretch. In some embodiments, the smooth stretch is reshaped. For example, the smooth stretch may be "stretched" in the same direction as the direction in which the cursor moves during the drag gesture. The limit point(s) that bound the smooth stretch may be fixed (i.e., not modified with the reshape or width modification) or not. For example, in the case of Rule 2, the limit points are fixed.

In various embodiments, a variety of techniques may be used to determine the parameters used to define the way the smooth stretch is stretched.

In some embodiments, modifying the smooth stretch could include modifying the width of the smooth stretch. A variety of techniques may be used to modify the width. Various examples of modifying the width of a path are more fully described below.

Returning to step 1303, if it is determined that the designated point is selected, then at 1308, boundary points are identified as the first unselected anchor point on either side of selected portion of the path. The boundary points are used to define a modifiable portion of the path. At 1310, the portion of path between the boundary points is modified based on the drag gesture. For example, the modifiable portion may be "stretched" in the same direction as the direction in which the cursor moves during the drag gesture. The boundary points may be fixed (i.e., not modified with the reshape or width modification) or not. For example, in the case of Rule 7, at least one boundary point is not fixed.

In various embodiments, a variety of techniques may be used to determine the parameters used to define the way the modifiable portion is stretched.

In some embodiments, modifying the modifiable portion could include modifying the width of the modifiable portion. A variety of techniques may be used to modify the width. Various examples of modifying the width of a path are more fully described below.

Figure 14:
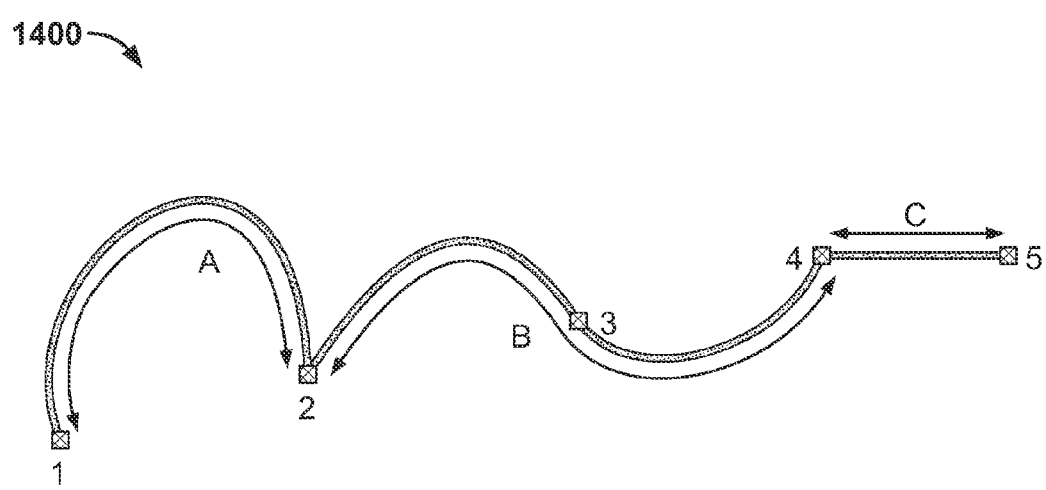
FIG. 14 is a diagram illustrating an example of a path before modification.

FIG. 14 is a diagram illustrating an example of a path before modification. In this example, path 1400 is shown to include five anchor points (1-5) and three smooth stretches (A, B, and C). Smooth stretch B contains two path segments. Path 1400 has an initial uniform path width as shown.

In some embodiments, width adjustment occurs using a drag gesture that starts with its mouse down within the selection tolerance of a stroke edge but not within the selection tolerance of the path. If the stroke width at the mouse down is less than the selection tolerance, width adjustment occurs if the drag gesture starts within twice the selection tolerance of the path but not within the selection tolerance of the path.

In some embodiments, as illustrated below, the width adjustment affects the same section of the path as would be affected by a reshape drag that started on the closest point of the path. In cases where the reshape drag would move the path, the width adjustment affects the entire path.

When a width adjustment drag begins, the application constructs a line that extends perpendicularly from the original path in the direction of where the drag began. The line ends on the path and extends indefinitely in the other direction. During the drag, the cursor acts as if it were always on this line, much the same way as shift normally constrains a drag. In some embodiments the portion of the line between the path and the effective cursor position is shown for feedback.

In some embodiments, width modification is performed as follows:

If the anchor points that delimit the width adjustment (i.e. the limit points for a smooth-stretch adjustment, or the first unselected anchor points for a selected-portion adjustment) do not currently have width specifications, create width specifications at those anchor points with the current width there. These specifications do not change during the adjustment (i.e. the path width does not change at these points).

Construct a new width specification at the location of the adjustment. This specification is directly modified by the adjustment. Existing width specifications inside the area being modified are also modified but to a lesser degree, depending upon how far they are from the location of the adjustment. Possible methods include a quadratic or sine wave drop-off.

As a result, there is a variable width adjustment; that is, the designated point on the path has a given width specification that tapers down to the anchor points that delimit the width adjustment, as shown in FIGS. 15-24. The tapering function may be a quadratic, sine wave drop off, a cubic polynomial, for example.

In FIGS. 15-27, the original stroke is shown in gray and the modified or width adjusted stroke is shown in black.

Figure 15:
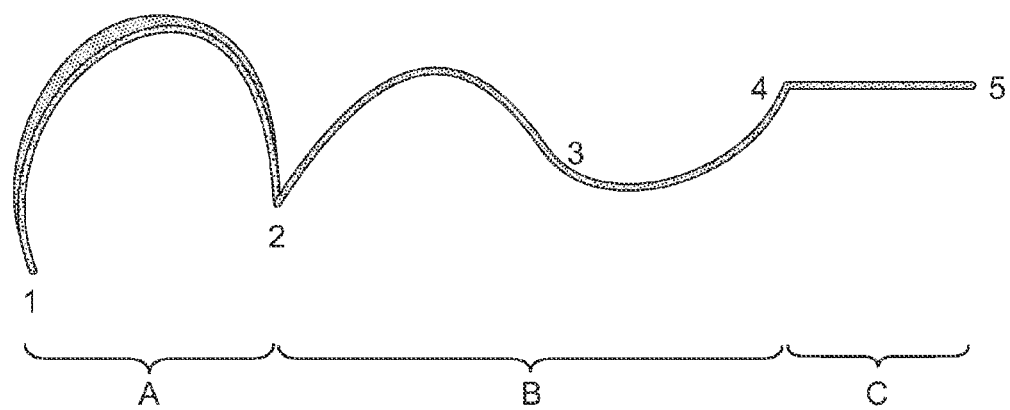
FIG. 15 is a diagram illustrating an example of a path after a stretch comprising a single segment is width adjusted.

FIG. 15 is a diagram illustrating an example of a path after a stretch comprising a single segment is width adjusted. In the example shown, path 1400 is shown after a stretch is width adjusted when nothing is selected. In other words, a user has not selected any point or segment in path 1400, places a cursor within the selection tolerance of a stroke edge of stretch A, and then drags upward. As a result, stretch A is width adjusted as shown. In this example, the designated point is not a limit point (i.e., a corner or end anchor point that bounds stretch A) of stretch A. Therefore, the limit points of stretch A (anchor points 1 and 2) are fixed in width (i.e., not width adjusted) and the interior points of stretch A are width adjusted. (Rule 2)

Figure 16:
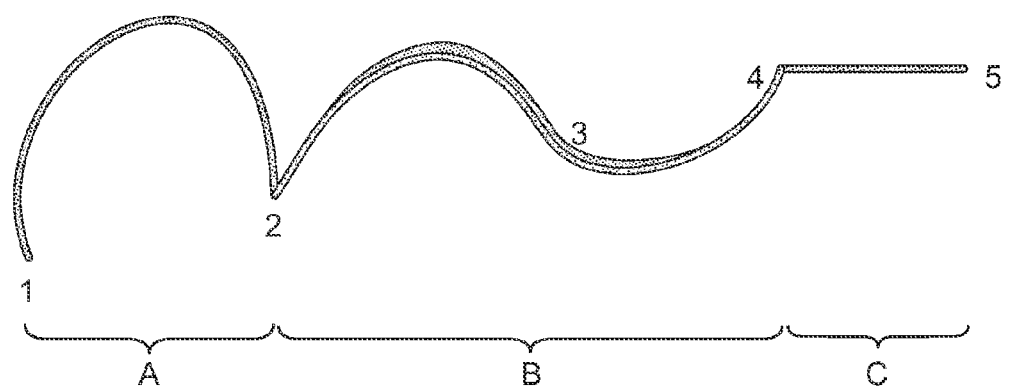
FIG. 16 is a diagram illustrating an example of a path after a stretch comprising two segments is width adjusted.

FIG. 16 is a diagram illustrating an example of a path after a stretch comprising two segments is width adjusted. In the example shown, path 1400 is shown after a stretch comprising two segments is width adjusted when nothing is selected. In other words, a user has not selected any point or segment in path 1400, places a cursor within the selection tolerance of a stroke edge of stretch B, and then drags upward. As a result, the entire stretch B, including the two segments, is width adjusted as shown. In this example, the designated point is not a limit point (i.e., a corner or end anchor point that bounds stretch B) of stretch B. Therefore, the limit points of stretch B (anchor points 2 and 4) are fixed and the interior points of stretch A are width adjusted. (Rule 2)

Figure 17:
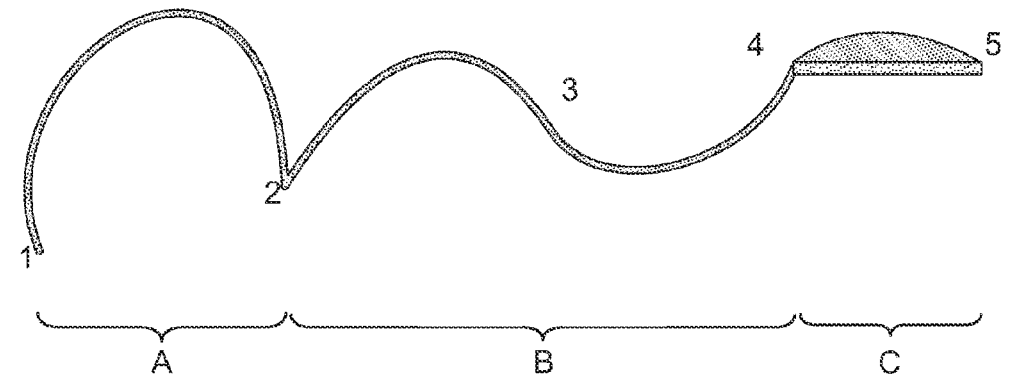
FIG. 17 is a diagram illustrating an example of a path after a stretch comprising a single straight segment is width adjusted.

FIG. 17 is a diagram illustrating an example of a path after a stretch comprising a single straight segment is width adjusted. In the example shown, path 1400 is shown after a stretch is width adjusted when nothing is selected. In other words, a user has not selected any point or segment in path 1400, places a cursor within the selection tolerance of a stroke edge of stretch C, and then drags upward. As a result, stretch C is width adjusted as shown. In this example, the designated point is not a limit point (i.e., a corner or end anchor point that bounds stretch C) of stretch C. Therefore, the limit points (anchor points 4 and 5) are fixed in width (i.e., not width adjusted) and the interior points of stretch C are width adjusted. (Rule 2)

Figure 18:
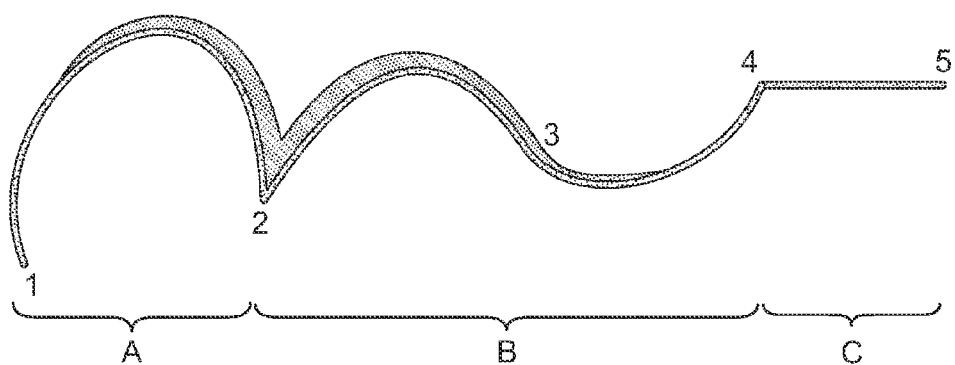
FIG. 18 is a diagram illustrating an example of a path after a width adjustment at an anchor point.

FIG. 18 is a diagram illustrating an example of a path after a width adjustment at an anchor point. In the example shown, path 1400 is shown after an anchor point is dragged when nothing is selected. In other words, a user has not selected any point or segment in path 1400, places a cursor within the selection tolerance of a stroke edge of anchor point 2, and then drags upward. As a result, stretches A and B are width adjusted as shown. In this example, the designated point is a limit point (i.e., a corner or end anchor point that bounds stretches A and B) of stretches A and B. Therefore, both the limit point (anchor point 2) and the interior points of the smooth stretches (stretches A and B) adjacent to the designated point are width adjusted. The other limit points (anchor points 1 and 4) of the smooth stretches A and B are fixed in width (i.e., not width adjusted). (Rule 3)

Figure 19:
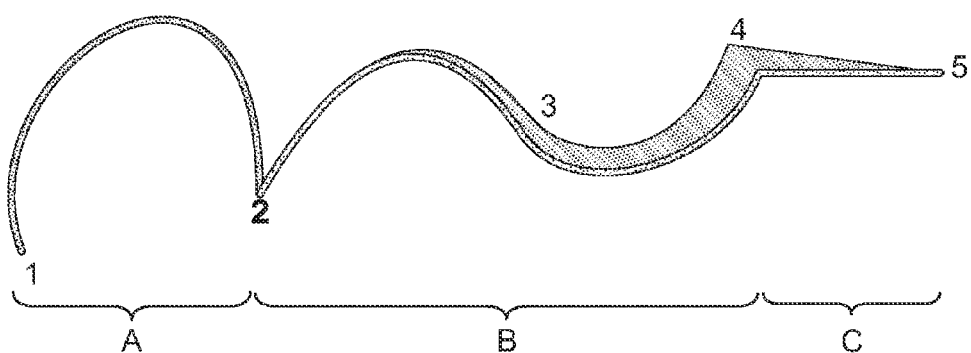
FIG. 19 is a diagram illustrating an example of a path after a width adjustment at another anchor point.

FIG. 19 is a diagram illustrating an example of a path after a width adjustment at another anchor point. In the example shown, path 1400 is shown after an anchor point is dragged when nothing is selected. In other words, a user has not selected any point or segment in path 1400, places a cursor within the selection tolerance of a stroke edge of anchor point 4, and then drags upward and to the left. As a result, stretches B and C are width adjusted as shown. In this example, the designated point is a limit point (i.e., a corner or end anchor point that bounds stretches B and C) of stretches B and C. Therefore, both the limit point (anchor point 4) and the interior points of the smooth stretches (stretches B and C) adjacent to the designated point are width adjusted. The other limit points (anchor points 2 and 5) of the smooth stretches B and C are fixed in width (i.e., not width adjusted). (Rule 3)

Figure 20:
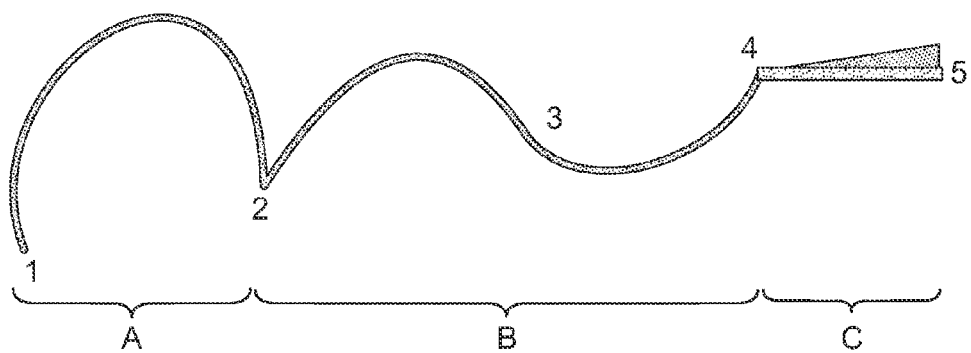
FIG. 20 is a diagram illustrating an example of a path after a width adjustment at an end anchor point.

FIG. 20 is a diagram illustrating an example of a path after a width adjustment at an end anchor point. In the example shown, path 200 is shown after an end anchor point is dragged when nothing is selected. In other words, a user has not selected any point or segment in path 1400, places a cursor within the selection tolerance of a stroke edge of anchor point 5, and then drags upward. As a result, stretch C is width adjusted as shown. In this example, the designated point is a limit point (i.e., a corner or end anchor point that bounds stretch C) of stretch C. Therefore, both the limit point (anchor point 5) and the interior points of the smooth stretch (stretch C) adjacent to the limit point (anchor point 5) move. The other limit point (anchor point 4) is fixed in width (i.e., not width adjusted). (Rule 3)

Figure 21:
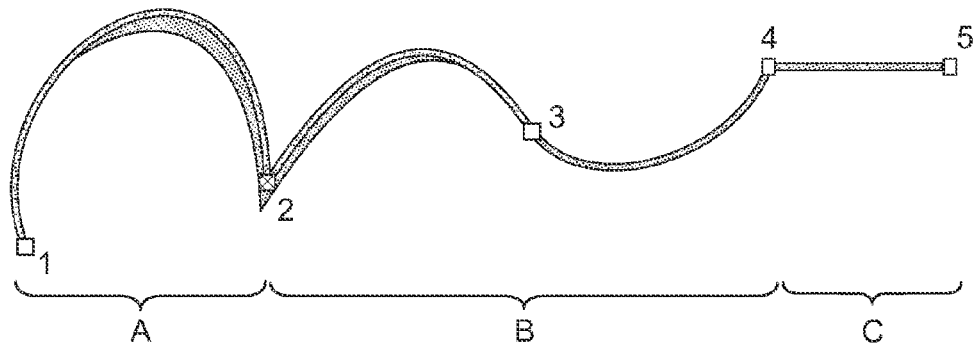
FIG. 21 is a diagram illustrating an example of a path after width adjusting at a selected anchor point.

FIG. 21 is a diagram illustrating an example of a path after width adjusting at a selected anchor point. In the example shown, path 1400 is shown after an anchor point is dragged when the anchor point is selected. In this example, a user has selected anchor point 2 in path 1400, placed a cursor within the selection tolerance of a stroke edge of anchor point 2, and then dragged downward. As a result, stretch A and the segment of stretch B between anchor points 2 and 3 are width adjusted as shown. Anchor points 1 and 3 remain fixed in width and the portion of path 1400 between anchor points 1 and 3 is width adjusted. This is because anchor points 1 and 3 are the first unselected anchor points adjacent to selected anchor point 2 in either direction. (Rule 5)

Figure 22:
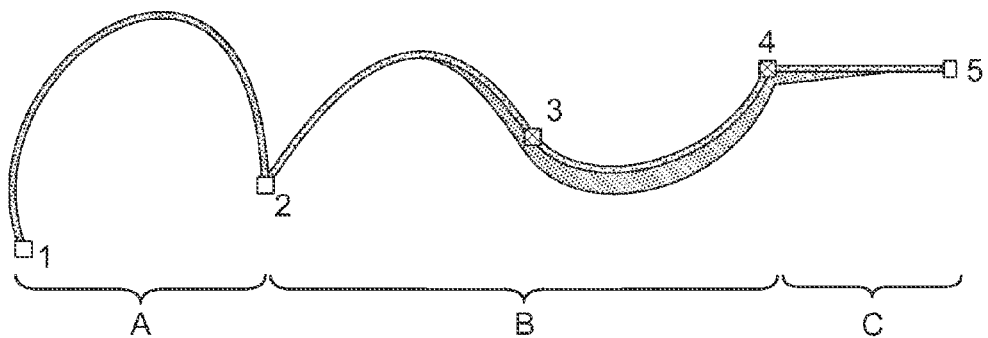
FIG. 22 is a diagram illustrating an example of a path after width adjusting at a point on a path between two selected anchor points.

FIG. 22 is a diagram illustrating an example of a path after width adjusting at a point on a path between two selected anchor points. In this example, a user has selected anchor points 3 and 4 in path 1400, placed a cursor within the selection tolerance of a stroke edge of a point on path 1400 between anchor points 3 and 4, and then dragged downward. As a result, stretches B and C are width adjusted as shown. Anchor points 2 and 5 remain fixed in width and the portion of path 1400 between anchor points 2 and 5 is width adjusted. This is because anchor points 2 and 5 are the first unselected anchor points adjacent to selected anchor points 3 and 4 in either direction. (Rule 5)

Figure 23:
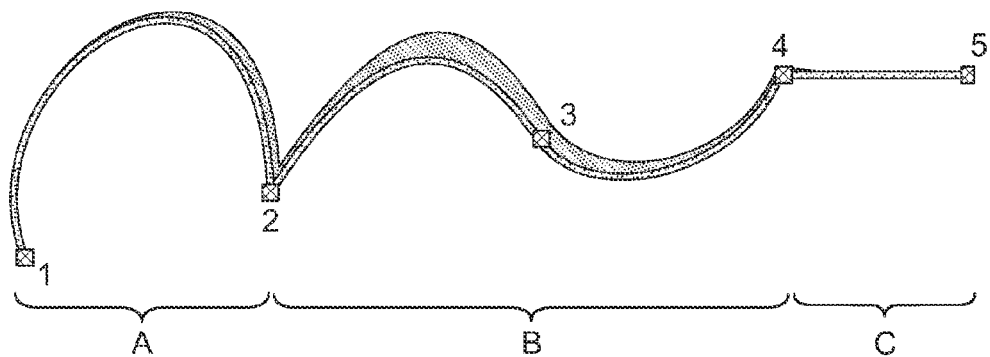
FIG. 23 is a diagram illustrating an example of a path after width adjusting at a point on a path that is fully selected.

FIG. 23 is a diagram illustrating an example of a path after width adjusting at a point on a path that is fully selected. In this example, a user has selected all anchor points on path 1400, placed a cursor within the selection tolerance of a stroke edge of the middle of path 1400, and then dragged upward. As a result, stretches A, B, and C are width modified as shown. Anchor points 1 and 5 remain fixed in width and the portion of path 1400 between anchor points 1 and 5 is width adjusted. This is because anchor points 1 and 5 are endpoints. (Rule 6)

Figure 24:
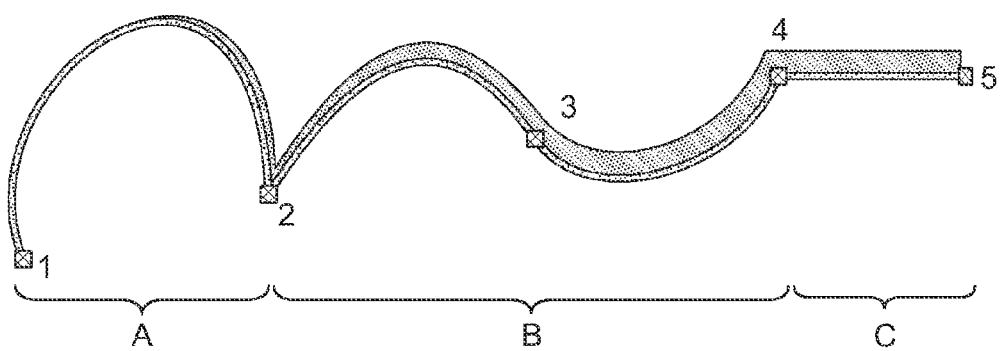
FIG. 24 is a diagram illustrating an example of a path after width adjusting an endpoint of a path that is fully selected.

FIG. 24 is a diagram illustrating an example of a path after width adjusting an endpoint of a path that is fully selected. In this example, a user has selected all anchor points on path 1400, placed a cursor within the selection tolerance of a stroke edge of endpoint 5 of path 1400, and then dragged upward. As a result, stretches A, B, and C are width modified as shown. Anchor point 1 remains fixed in width and the rest of path 1400 (including anchor point 5) is width adjusted. This is because anchor points 1 and 5 are endpoints and endpoint 5 is being dragged. (Rule 7)

In some embodiments, modifier keys are used to modify or alter the behavior of the width adjustment. Some examples of modifier keys include the following:

In some embodiments, holding down or depressing the Option/Alt key when the width modification drag completes makes the modification affect the widths on both sides of the path simultaneously. Alternatively, the modification by default modifies both sides and Option/Alt makes the modification affect only one side.

In some embodiments, holding down or depressing the Shift key when the width modification drag completes (i.e., shift-adjusting or shift-width adjusting) changes the modification in several ways:

When adjusting a single selected anchor point, there is no change.

For a smooth-stretch adjustment, it makes the modification also include the limit points.

The special case described in the reshape behavior for open paths with a selected endpoint does not occur, so the width at a selected endpoint is modified.

Instead of gradually tapering off, all width specifications change uniformly by adding or subtracting the same amount. No new width specification at the modification point is needed.

The width change stops at the ends of its range; it does not extend into adjacent segments.

Examples of the effect of the Shift key include the following:

For a rectangle, width-adjusting one side normally makes the stroke on that side bulge or hollow. Shift-adjusting makes that entire side uniformly thicker or thinner.

For a fully-selected open path, width adjusting normally leaves the widths at the ends unmodified, creating a tapered width. Shift-adjusting adds or subtracts width uniformly along one side of the entire path.

The above are merely examples of some of the modifier key variations that are possible. In various embodiments, a variety of modifier keys and associated behaviors may be used. The following are some examples of shift-width adjusting.

Figure 25:
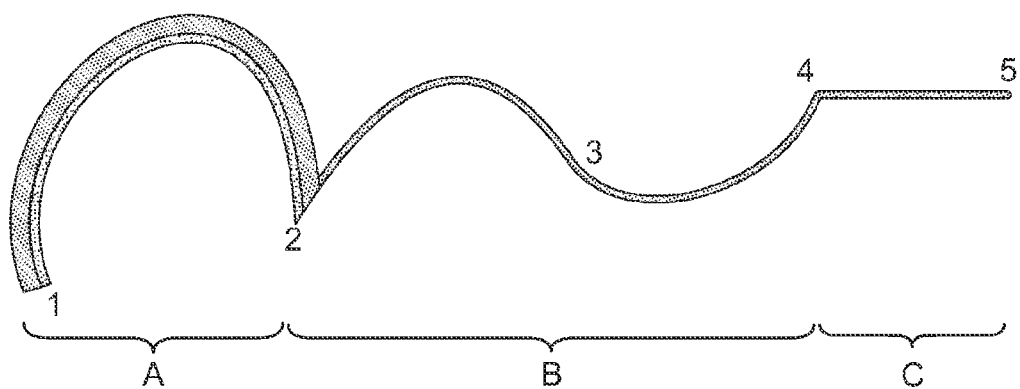
FIG. 25 is a diagram illustrating an example of a path after a stretch comprising a single segment is width adjusted using a modifier key.

FIG. 25 is a diagram illustrating an example of a path after a stretch comprising a single segment is width adjusted using a modifier key. In the example shown, path 1400 is shown after a stretch is width adjusted and the Shift key is held down (at least when the width adjusting drag is complete) when nothing is selected. In other words, a user has not selected any point or segment in path 1400, places a cursor within the selection tolerance of a stroke edge of stretch A, drags upward, and depresses the Shift key. As a result, stretch A is uniformly width adjusted as shown. In this example, the Shift key is held down at the end of the drag. Therefore, the limit points of stretch A (anchor points 1 and 2) are also uniformly adjusted in width along with the interior points of stretch A.

Figure 26:
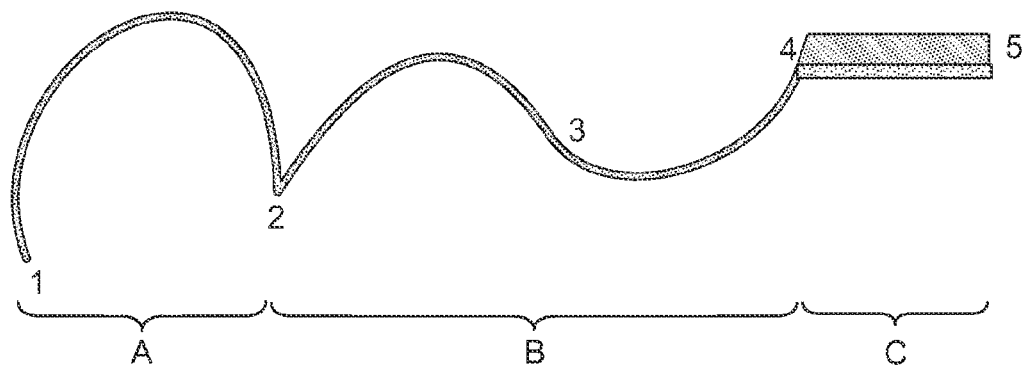
FIG. 26 is a diagram illustrating an example of a path after a stretch comprising a single straight segment is width adjusted using a modifier key.

FIG. 26 is a diagram illustrating an example of a path after a stretch comprising a single straight segment is width adjusted using a modifier key. In the example shown, path 1400 is shown after a stretch is width adjusted while the Shift key is held down (at least when the width adjusting drag is complete) when nothing is selected. In other words, a user has not selected any point or segment in path 1400, places a cursor within the selection tolerance of a stroke edge of stretch C, drags upward, and depresses the Shift key. As a result, stretch C is uniformly width adjusted as shown. In this example, the Shift key is held down at the end of the drag. Therefore, the limit points (anchor points 4 and 5) are also uniformly adjusted in width along with the interior points of stretch C.

Figure 27:
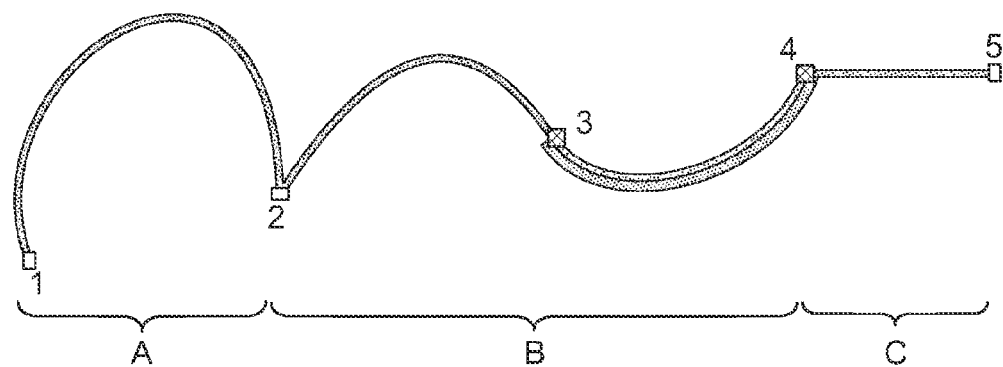
FIG. 27 is a diagram illustrating an example of a path after width adjusting at a point on a path between two selected anchor points when a modifier key is used.

FIG. 27 is a diagram illustrating an example of a path after width adjusting at a point on a path between two selected anchor points when a modifier key is used. In this example, a user has selected anchor points 3 and 4 in path 1400, placed a cursor within the selection tolerance of a stroke edge of a point on path 1400 between anchor points 3 and 4, dragged, and depressed the Shift key. As a result, the segment of stretch B between anchor points 3 and 4 is uniformly width adjusted as shown. In this example, the Shift key is held down at the end of the drag. Therefore, the width change does not extend into adjacent segments and only the segment of stretch B between anchor points 3 and 4 is width adjusted. In addition, the limit points (anchor points 3 and 4) are also uniformly adjusted in width along with the interior points of the segment (of stretch B between anchor point 3 and 4).

In some embodiments, path manipulation and width variation may be combined into the same tool. For example, whether path manipulation or width variation is invoked or activated could depend on whether the mouse down point prior to the drag is on the path or to the side of the path. As an example, if the mouse down is on the path, then path manipulation could be activated. If the mouse down is within 2 pixels on either side of the path, width manipulation could be activated. If the stroke is wide, if the mouse down is in the center of the path, path manipulation could be activated; and if the mouse down is in the edges (away from the center) of the wide path, width manipulation could be activated. In some embodiments, the cursor could change to provide feedback as to which function (i.e., path manipulation or width variation) is activated.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive an indication of a drag gesture associated with a designated point on a path;
identify the first path corner or endpoint on each side of the designated point as limit points;
define a smooth stretch of the path as a portion of the path between the limit points; and
modify the smooth stretch of the path based on the drag gesture without modifying portions outside of the smooth stretch; and
a memory coupled to the processor and configured to provide the processor with instructions.

2. A system as recited in claim 1, wherein the designated point is an unselected point.

3. A system as recited in claim 1, wherein the designated point is on an unselected portion of the path.

4. A system as recited in claim 1, wherein the drag gesture includes holding a mouse button down and dragging the mouse.

5. A system as recited in claim 1, wherein the designated point is a point on the path within a selection tolerance of a mouse down point associated with the drag gesture.

6. A system as recited in claim 1, wherein modify includes path modification.

7. A system as recited in claim 1, wherein modify includes width modification.

8. A system as recited in claim 1, wherein modify includes variable width modification.

9. A system as recited in claim 1, wherein a corner is geometrically defined.

10. A system as recited in claim 1, wherein a corner is defined based on an angle between tangents to points on either side of a given point.

11. A system as recited in claim 1, wherein a corner is user defined.

12. A system as recited in claim 1, wherein a modifier key is used in conjunction with the drag gesture.

13. A computer implemented method, comprising:
receiving an indication of a drag gesture associated with a designated point on a path;

identifying the first path corner or endpoint on either side of the designated point as limit points;

defining a smooth stretch of the path as a portion of the path between the limit points; and modifying the smooth stretch of the path based on the drag gesture without modifying portions outside of the smooth stretch.

14. A method as recited in claim 13, wherein defining a smooth stretch of the path is performed using a processor.

15. A method as recited in claim 13, wherein the designated point is an unselected point.

16. A method as recited in claim 13, wherein modifying includes path modification.

17. A method as recited in claim 13, wherein modifying includes width modification.

18. A method as recited in claim 13, wherein modifying includes variable width modification.

19. A method as recited in claim 13, wherein a corner is geometrically defined.

20. A computer program product, the computer program product being embodied in a computer readable storage medium and comprising computer instructions for:

receiving an indication of a drag gesture associated with a designated point on a path;

identifying the first path corner or endpoint on either side of the designated point as limit points;

defining a smooth stretch of the path as a portion of the path between the limit points; and modifying the smooth stretch of the path based on the drag gesture without modifying portions outside of the smooth stretch.

* * * * *